US010794999B2

(12) United States Patent
Komuro et al.

(10) Patent No.: US 10,794,999 B2
(45) Date of Patent: Oct. 6, 2020

(54) METHOD FOR DETECTING EDGE OF OBJECT BY LASER RANGING DEVICE

(71) Applicant: HONDA MOTOR CO., LTD., Tokyo (JP)

(72) Inventors: Satoshi Komuro, Saitama (JP); Hiroki Iikura, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 356 days.

(21) Appl. No.: 15/920,726

(22) Filed: Mar. 14, 2018

(65) Prior Publication Data

US 2018/0284230 A1    Oct. 4, 2018

(30) Foreign Application Priority Data

Mar. 28, 2017   (JP) ................................. 2017-062855

(51) Int. Cl.
  *G01S 7/00*     (2006.01)
  *G01S 7/48*     (2006.01)
  *G01S 17/42*    (2006.01)

(52) U.S. Cl.
  CPC ............ *G01S 7/4808* (2013.01); *G01S 17/42* (2013.01)

(58) Field of Classification Search
  USPC ...................................................... 356/4.01
  See application file for complete search history.

(56) References Cited

U.S. PATENT DOCUMENTS

| 4,952,058 | A  | * | 8/1990  | Noguchi  | G01N 21/94 |
|           |    |   |         |          | 356/237.5 |
| 5,539,719 | A  | * | 7/1996  | Motoi    | G02B 26/123 |
|           |    |   |         |          | 250/208.1 |
| 6,798,503 | B2 | * | 9/2004  | Hiramoto | G01N 21/8806 |
|           |    |   |         |          | 250/559.36 |
| 6,901,313 | B2 | * | 5/2005  | Mori     | B62D 57/032 |
|           |    |   |         |          | 700/245 |
| 7,099,747 | B2 | * | 8/2006  | Mikami   | G06N 3/008 |
|           |    |   |         |          | 180/8.1 |
| 7,127,326 | B2 | * | 10/2006 | Lewis    | B25J 13/081 |
|           |    |   |         |          | 700/258 |
| 7,650,239 | B2 | * | 1/2010  | Samukawa | G06K 9/3241 |
|           |    |   |         |          | 701/300 |

(Continued)

FOREIGN PATENT DOCUMENTS

JP    2004-234349    8/2004
WO    2014/132509    9/2014

*Primary Examiner* — James R Hulka
(74) *Attorney, Agent, or Firm* — Rankin, Hill & Clark LLP

(57) ABSTRACT

The present invention provides a method for detecting an edge of an object by using a laser ranging device. An n number of measurement points P(i), P(i−1) and P(i+1) corresponding to an n number of projection lines that are close to each other are extracted from a plurality of measurement points, the distances of which have been measured by a laser ranging device 1, and an approximate straight line L(i) that passes through the n number of measurement points is calculated. The degree of inclination e(i) of the approximate straight line L(i) for a representative line of projection lines corresponding to the n number of measurement points is determined. If the degree of inclination is smaller than a predetermined threshold value, then one of the n number of measurement points is identified as a measurement point of an edge of an object.

8 Claims, 8 Drawing Sheets

(56) References Cited

U.S. PATENT DOCUMENTS

| | | | | |
|---|---|---|---|---|
| 8,970,397 | B2* | 3/2015 | Nitanda | G01S 17/42 |
| | | | | 340/901 |
| 9,411,338 | B2* | 8/2016 | Hanaoka | G01B 11/24 |
| 9,791,555 | B2* | 10/2017 | Zhu | G01S 17/08 |
| 10,444,332 | B2* | 10/2019 | Rowekamper | G01S 7/4972 |
| 10,444,758 | B2* | 10/2019 | Serizawa | G05D 1/0244 |
| 10,527,489 | B2* | 1/2020 | Sakohira | G02B 26/105 |
| 10,633,045 | B2* | 4/2020 | Komuro | G05D 1/10 |
| 2003/0184743 | A1* | 10/2003 | Hiramoto | G01N 21/8806 |
| | | | | 356/237.1 |
| 2005/0225478 | A1* | 10/2005 | Nakamura | G01S 17/931 |
| | | | | 342/70 |
| 2006/0103927 | A1* | 5/2006 | Samukawa | G01S 17/931 |
| | | | | 359/436 |
| 2012/0001769 | A1* | 1/2012 | Nitanda | G01S 17/931 |
| | | | | 340/901 |
| 2014/0211194 | A1* | 7/2014 | Pacala | G01S 17/06 |
| | | | | 356/5.01 |
| 2015/0124242 | A1* | 5/2015 | Pierce | G01S 17/89 |
| | | | | 356/5.01 |
| 2015/0362921 | A1* | 12/2015 | Hanaoka | G05D 1/0274 |
| | | | | 701/23 |
| 2016/0223652 | A1* | 8/2016 | Bosse | G01S 7/4808 |
| 2018/0067199 | A1* | 3/2018 | Rowekamper | G01S 17/42 |
| 2018/0267153 | A1* | 9/2018 | Komuro | G01S 7/4876 |
| 2018/0274916 | A1* | 9/2018 | Komuro | G01S 17/08 |
| 2018/0274972 | A1* | 9/2018 | Sakohira | G02B 5/189 |
| 2018/0281881 | A1* | 10/2018 | Komuro | B25J 9/1605 |

* cited by examiner

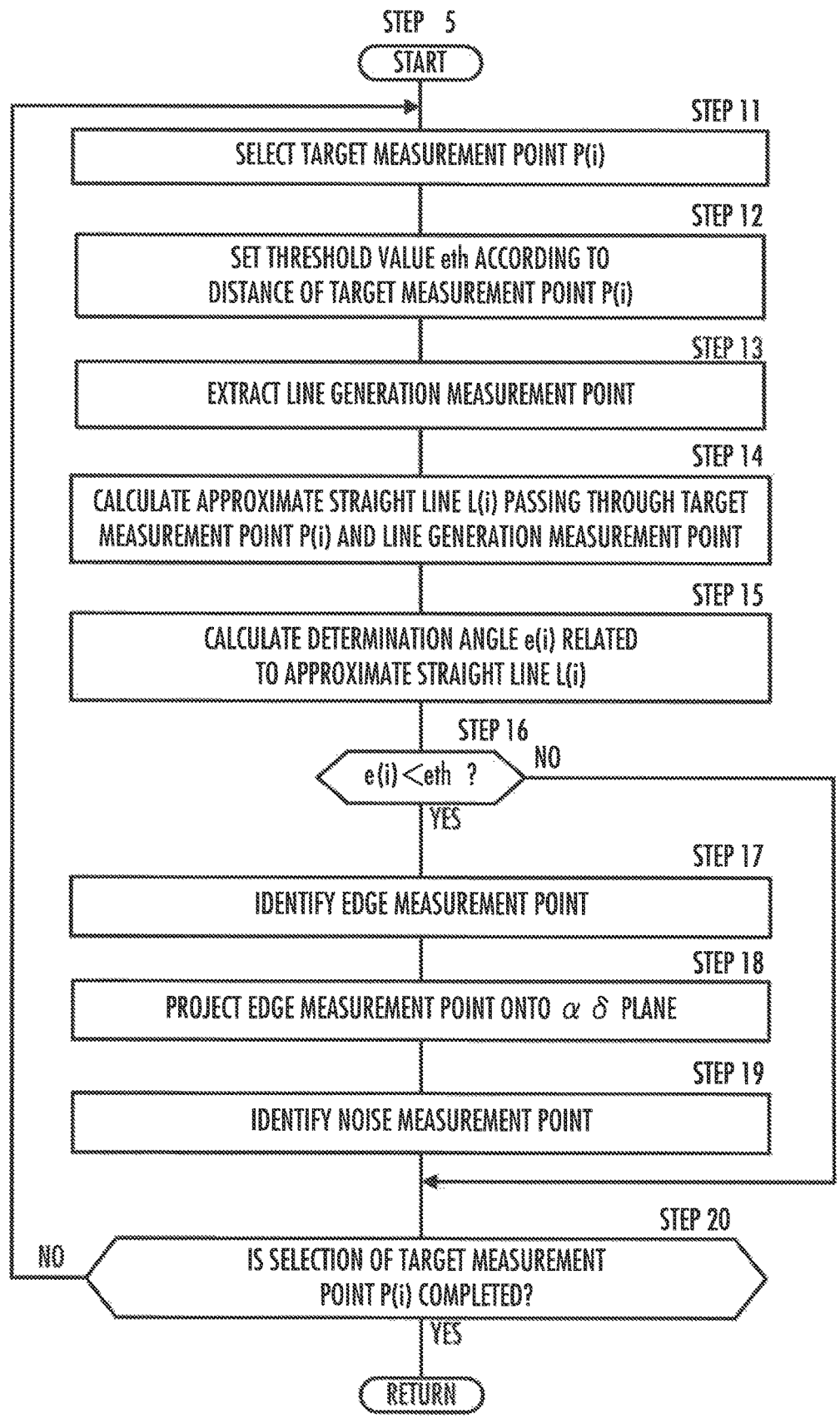

DISTANCE OF OBJECT A: LARGE

DISTANCE OF OBJECT A: SMALL

METHOD FOR DETECTING EDGE OF OBJECT BY LASER RANGING DEVICE

BACKGROUND OF THE INVENTION

Field of the Invention

The present invention relates to a method for detecting the edge of an object by using measurement data obtained by a laser ranging device, such as a laser range finder.

Description of the Related Art

A laser ranging device, such as a laser range finder, is configured to be capable of emitting a scanning laser beam to measure the distances to a plurality of measurement points (the reflection points of a laser beam) in the range of the scanning. This type of laser ranging device is used as, for example, a sensor for recognizing the external shape of an object, or a sensor for recognizing an environment in the operating environment of a mobile body (refer to, for example, International Application Publication No. WO2014/132509 and Japanese Patent Application Laid-Open No. 2004-234349).

It is preferable for an edge of an object, which provides the outer peripheral boundary of the object, to be properly detected when recognizing the shape of the object or recognizing its surrounding environment by using a laser ranging device, such as a laser range finder. In this case, generally, a distance image is generated from measurement data obtained by a laser ranging device, and the edge is detected on the basis of the distance image.

However, the distance measurement values, which are obtained by a laser ranging device, especially the distance measurement values at measurement points in the vicinity of the edge of an object, tend to include measurement values having low reliability due to the influence of a so-called multi-echo. Further, an error of an entire distance image may occur due to an error of the positional relationship between the coordinate system on which a distance image is based and a laser ranging device.

Hence, detecting an edge on the basis of a distance image tends to results in erroneous detection of the position of the edge.

SUMMARY OF THE INVENTION

The present invention has been made in view of the background described above, and it is an object of the invention to provide a method that makes it possible to properly detect an edge of an object by using measurement data obtained by a laser ranging device.

To this end, the method for detecting an edge of an object in accordance with the present invention is a method for detecting an edge of an object by using measurement data of each of a plurality of measurement points obtained by a laser ranging device which projects a scanning laser beam in a predetermined direction to measure the distance of each of the plurality of measurement points corresponding to each of a plurality of projection lines of the laser beam in the scanning range of the laser beam, the method including:

a first step of extracting, from the plurality of measurement points, an n number (n: an integer of 2 or more) of measurement points corresponding to an n number of projection lines that are close to each other;

a second step of calculating an approximate straight line that passes through the n number of measurement points by using the measurement data of each of the n number of measurement points;

a third step of determining the degree of inclination of the approximate straight line with respect to an averaged line, which is a representative line of the projection lines corresponding to the n number of measurement points or a line in a direction obtained by averaging the directions of the projection lines corresponding to the n number of measurement points; and a fourth step of identifying, as the measurement point of the edge of the object, one measurement point among the n number of measurement points in the case where the degree of inclination is smaller than a predetermined threshold value (a first aspect of the invention).

A supplementary description will be given of the terms in the present invention. The term "projection line" means a line that indicates the path of a laser beam output in the scanning range by a laser ranging device.

Further, the phrase "an n number (n: an integer of 2 or more) of projection lines that are close to each other" means an n number of projection lines that belong to a local range of the entire scanning range.

In this case, in a laser ranging device adapted to perform scanning by a laser beam, changing the direction of the laser beam, the phrase "an n number (n: an integer of 2 or more) of projection lines that are close to each other" means an n number of projection lines, the directions of which are close to each other (e.g. the difference between the directions falls within a predetermined range).

Further, in the case of a laser ranging device adapted to perform linear laser beam scanning by maintaining the laser beam in a constant direction, the phrase "an n number (n: an integer of 2 or more) of projection lines that are close to each other" means an n number of projection lines, the positions of which are close to each other (e.g. the difference between the positions falls within a predetermined range).

Further, the phrase "the measurement point of an edge of an object" more specifically means a measurement point that will exist at a position on a line of the edge of the object or at a position close to the line when the object is observed in the direction of a laser beam projection line corresponding to the measurement point (i.e. when the object is observed by projecting the object onto a plane that is orthogonal to the projection line).

According to various experiments and studies by the present inventors, if the n number of projection lines are lines that pass through the vicinity of the edge of an object, then the degree of inclination of the approximate straight line tends to be small independently of the influence of a multi-echo.

According to the present invention, therefore, if the degree of inclination is smaller than a predetermined threshold value, then one measurement point among the n number of measurement points is identified as the measurement point of the edge of an object.

Thus, according to the present invention, the measurement point of the edge of an object can be properly (highly reliably) identified by using the measurement data obtained by a laser ranging device.

The first aspect of the invention described above may further include a fifth step of identifying, as noise data, the measurement data corresponding to a measurement point having the largest distance measurement value among the n number of measurement points in the case where the degree of inclination is smaller than the predetermined threshold value (a second aspect of the invention).

With this arrangement, noise data having a distance measurement value with low reliability can be properly identified among the measurement data obtained by a laser ranging device.

Preferably, the foregoing first aspect of the invention further includes a sixth step of variably setting the predetermined threshold value used in the fourth step according to a representative value of the distance measurement values of the n number of measurement points or an average distance value obtained by averaging the distance measurement values of the n number of measurement points (a third aspect of the invention).

With this arrangement, the reliability of identifying the noise data can be further enhanced.

In the foregoing first aspect of the invention, the method is preferably configured such that the processing from the first step to the fourth step is repeatedly carried out, and the processing in the first step of each cycle is carried out such that at least one measurement point among an n number of measurement points extracted in the first step of each cycle of the repetition is a measurement point that is different from measurement points extracted in the first step of another cycle (a fourth aspect of the invention).

With this arrangement, the measurement point of the edge of an object can be identified in an entire or substantially entire laser beam scanning range. Further, if the fourth aspect of the invention is combined with the second aspect of the invention, then noise data can be identified in an entire or substantially entire laser beam scanning range.

In the foregoing fourth aspect of the invention, the laser ranging device may be configured such that the laser beam scanning can be performed in a rotational direction about a first axis, and a laser beam output section can be rotated about a second axis in the direction that is orthogonal to the first axis.

In this case, the method may further include a seventh step of rotating the laser beam output section and performing the laser beam scanning such that the laser beam scanning is performed in the rotational direction about the first axis at a plurality of rotational positions of the laser beam output section in the direction about the second axis, thereby acquiring the measurement data of the plurality of measurement points obtained by the laser ranging device by the laser beam scanning at the plurality of rotational positions of the laser beam output section, and a mode may be adopted, in which the processing from the first step to the fourth step is repeated for each group of the plurality of measurement points obtained by the laser ranging device in each scanning cycle of the laser beam corresponding to each of the plurality of rotational positions of the laser beam output section.

Further, in this case, the method preferably further includes an eighth step of projecting the measurement points of each edge, which are identified by repeating the processing from the first step to the fourth step for each group of the plurality of measurement points, onto a two-dimensional plane having the azimuth angle of the direction about the first axis and the azimuth angle of the direction about the second axis as two coordinate axis components; and a ninth step of identifying a line formed by a group of projected points linearly arranged on the two-dimensional plane as an edge line of an object (a fifth aspect of the invention).

In the fifth aspect of the invention, the phrase "performing the laser beam scanning in the rotational direction about the first axis at a plurality of rotational positions of the laser beam output section in the direction about the second axis" not only refers to a mode in which the laser beam scanning in the rotational direction about the first axis is performed in a state, in which the rotation of the laser beam output section in the direction about the second axis is stopped, at each of a plurality of rotational positions of the laser beam output section but also refers to a mode in which the laser beam scanning in the rotational direction about the first axis is repeated while rotating the laser beam output section in a direction about the second axis at a rotational speed that can be regarded to maintain the laser beam output section at a substantially constant rotational position in a period from the start to the end of one laser beam scanning cycle.

According to the fifth aspect of the invention, a measurement point of the edge is identified for each group of the plurality of measurement points obtained by the laser ranging device by each cycle of laser beam scanning corresponding to each of a plurality of rotational positions of the laser beam output section. Then, the identified measurement point of each edge will be projected onto the two-dimensional plane according to a set of the azimuth angle of the direction about the first axis and the azimuth angle of the direction about the second axis of a laser beam projection line corresponding to the measurement point.

If an object having an edge line that linearly extends is present in the scanning range of each of a plurality of laser beam scanning cycles in the seventh step, then a group of a plurality of projected points formed by projecting the measurement points of an edge onto the two-dimensional plane will be linearly arranged.

Thus, an edge line of an object can be identified by the ninth step. In this case, the edge line of an object can be identified on the two-dimensional plane from the projected point defined by the set of the azimuth angle of the direction about the first axis and the azimuth angle of the direction about the second axis of the laser beam projection line corresponding to a measurement point of the edge without the need for the spatial position data (on a three-dimensional space) of the measurement point of the edge.

Thus, according to the fifth aspect of the invention, an edge line of an object can be properly identified with high reliability.

The foregoing fifth aspect of the invention may adopt a mode in which the ninth step further includes a step of identifying, as the edge lines on both sides of an object that extends like a stick, a pair of lines, each of which is formed by a group of projected points linearly arranged on the two-dimensional plane, the pair of lines extending in parallel to each other (a sixth aspect of the invention).

With this arrangement, the edge lines on both sides of an object that extend in a stick-like shape, such as a hand rail, can be properly identified.

The method for detecting an edge of an object according to the present invention may adopt the following mode. The method for detecting an edge of an object according to the present invention is a method for detecting an edge of an object by using measurement data of each of a plurality of measurement points obtained by a laser ranging device which projects a scanning laser beam in a predetermined direction to measure the distance of each of the plurality of measurement points corresponding to each of a plurality of projection lines of the laser beam in the scanning range of the laser beam, the laser ranging device being configured such that the laser beam scanning is performed in a rotational direction about a first axis, and the laser beam output section can be rotated about a second axis in a direction that is orthogonal to the first axis, the method including:

a step A of performing rotating the laser beam output section and performing the laser beam scanning such that the laser beam scanning is performed in the rotational direction about the first axis at a plurality of rotational positions of the laser beam output section in the direction about the second axis, thereby acquiring the measurement data of the plurality of measurement points obtained by the laser ranging device by the laser beam scanning at the plurality of rotational positions of the laser beam output section;

a step B of identifying the measurement point of an edge of an object from the plurality of measurement points based on the measurement data of the plurality of measurement points obtained for the plurality of rotational positions of the laser beam output section;

a step C of projecting the measurement point of each edge identified for each of the plurality of rotational positions of the laser beam output section onto a two-dimensional plane having the azimuth angle in the direction about the first axis and the azimuth angle in the direction about the second axis as two coordinate axis components; and a step D of identifying a line formed by a group of projected points linearly arranged on the two-dimensional plane as an edge line of an object (a seventh aspect of the invention).

In the seventh aspect of the invention, the meaning of the phrase "performing the laser beam scanning in the rotational direction about the first axis at the plurality of rotational positions of the laser beam output section in the direction about the second axis" is the same as the meaning supplementarily described in relation to the foregoing fifth aspect of the invention.

As with the foregoing fifth aspect of the invention, the seventh aspect of the invention makes it possible to identify an edge line of an object on the two-dimensional plane from a projected point defined by the set of the azimuth angle of the direction about the first axis and the azimuth angle of the direction about the second axis of the laser beam projection line corresponding to the measurement point of the edge without the need for the spatial (on a three-dimensional space) position data of the measurement point of an edge.

Thus, according to the seventh aspect of the invention, an edge line of an object can be properly identified with high reliability.

In the foregoing seventh aspect of the invention, the step D may adopt a mode in which the step D further includes a step of identifying, as the edge lines on both sides of an object that extends like a stick, a pair of lines, each of which is formed by a group of projected points linearly arranged on the two-dimensional plane, the pair of lines extending in parallel to each other (an eighth aspect of the invention).

With this arrangement, the edge lines on both sides of an object that extend in a stick-like shape, such as a hand rail, can be properly identified.

BRIEF DESCRIPTION OF THE DRAWINGS

FIG. 5 is a flowchart illustrating the subroutine processing in STEP5 of FIG. 4;

DESCRIPTION OF THE PREFERRED EMBODIMENTS

Figure 1A:
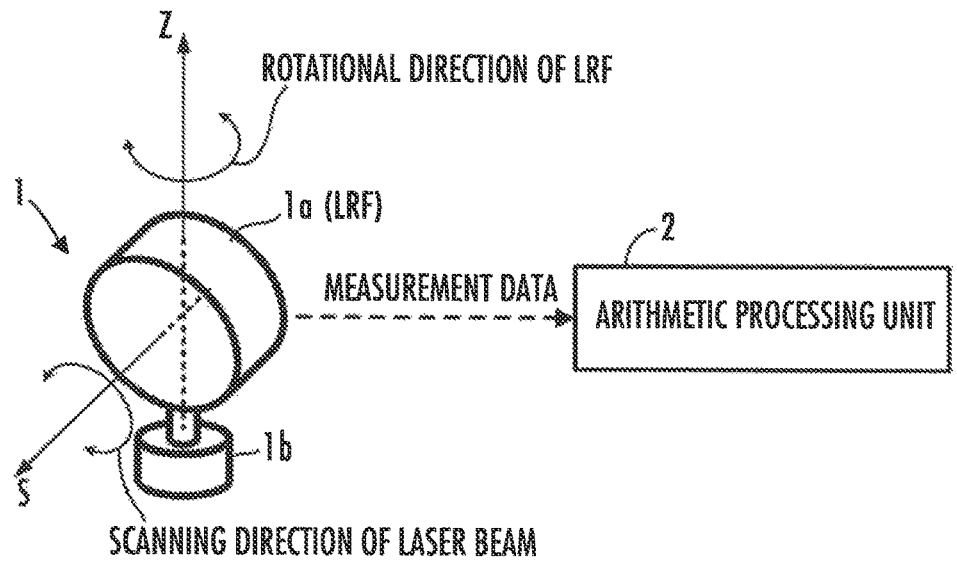
FIG. 1A is a schematic perspective view illustrating the outline of a laser ranging device in an embodiment of the present invention.
Figure 1B:
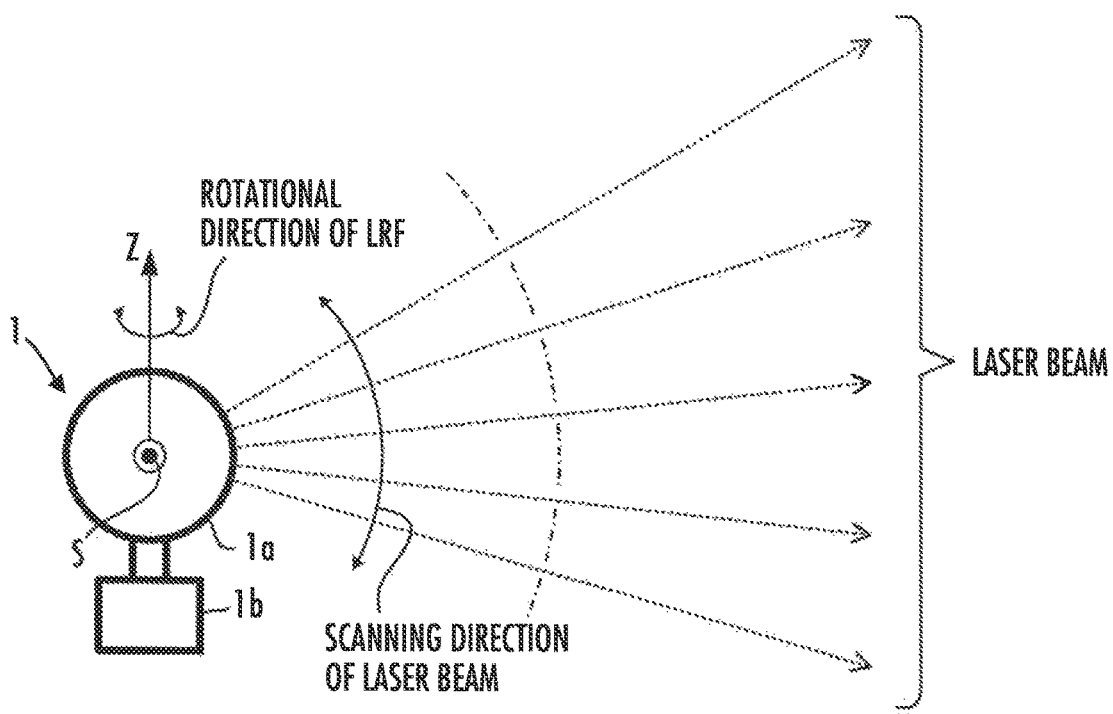
FIG. 1B is a diagram illustrating the laser ranging device observed in the direction of the S-axis in FIG. 1A.

An embodiment of the present invention will be described below with reference to FIG. 1A to FIG. 9C. Referring to FIG. 1A and FIG. 1B, a laser ranging device 1 to be described in the present embodiment has a laser range finder 1a, which is the main unit thereof, and an actuator 1b that rotatively drives the laser range finder 1a (hereinafter referred to as "the LRF 1a").

The LRF 1a has a function as a laser beam output section. The LRF 1a has a publicly known structure, and outputs a laser beam to perform scanning in a predetermined scanning range (i.e. a predetermined angle range) in a direction about a single axis, e.g., in the direction about the S-axis illustrated in FIG. 1A and FIG. 1B. More specifically, the LRF 1a outputs a laser beam such that projection lines, which indicate the projecting directions of the laser beam (i.e. the lines that provide the projection paths of the laser beam, namely, the lines illustrated by the dashed lines in FIG. 1B), are rotated in the direction about the S-axis in the predetermined angle range, as illustrated in FIG. 1B.

Then, for each of a plurality (a predetermined number) of projecting directions of the laser beams in the scanning range, the LRF 1a measures the distance of an object that reflects the laser beam output in each projecting direction (i.e. the distance from the LRF 1a) according to a time-of-flight (TOF) measurement technique, and outputs the measurement data. In this case, the plurality of laser beam projecting directions are, for example, the directions shifted by a predetermined pitch angle in the direction about the S-axis.

The LRF 1a may be configured to be capable of detecting the intensity (brightness) of the reflected light of the laser beam output in each projecting direction and outputting the data indicating the detection value of the intensity together with distance measurement data, in addition to being capable of measuring distances.

The actuator 1b of the laser ranging device 1 is composed of, for example, an electric motor. Further, the actuator 1b is connected to the LRF 1a so as to be capable of rotatively driving the LRF 1a in a direction orthogonal to the S-axis direction, e.g. in the direction about the Z-axis illustrated in FIG. 1A and FIG. 1B. This enables the orientation of the LRF 1a to be changed in the direction about the Z-axis. Further, a laser beam can be projected in the direction about the S-axis at a plurality of rotational angle positions of the LRF 1a in the direction about the Z-axis.

Figure 2:
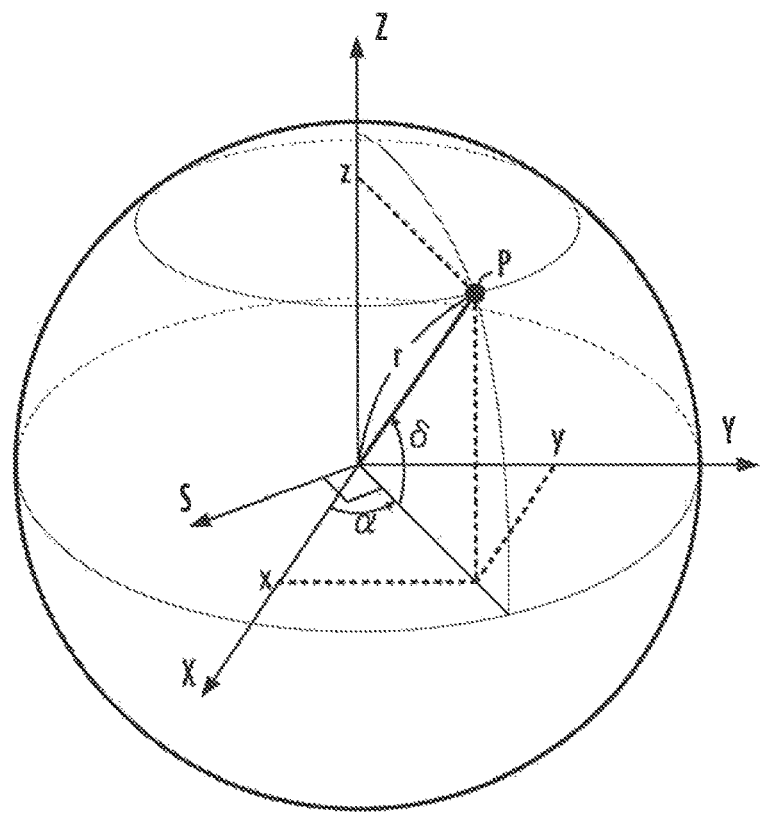
FIG. 2 is an explanatory diagram related to the operation of the laser ranging device of the embodiment.
Figure 3:
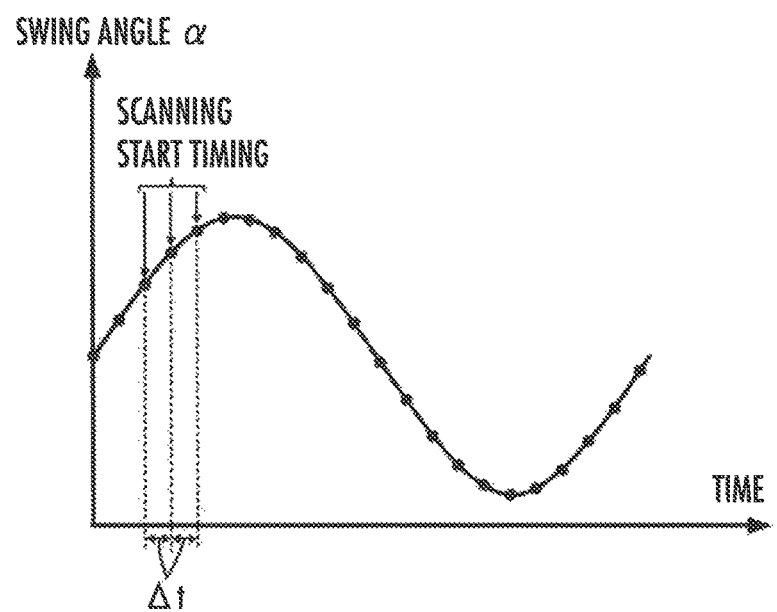
FIG. 3 is a graph related to the operation of the laser ranging device of the embodiment.

For example, the LRF 1a can be rotated in the direction about the Z-axis and the laser beam scanning can be performed in the direction about the X-axis according to the pattern illustrated in FIG. 3. In the following description, the rotational angle in the direction about the Z-axis will be denoted by a reference symbol $\alpha$ and will be referred to as the swing angle $\alpha$, as illustrated in FIG. 2. Further, the azimuth angle of the projection line of a laser beam in the direction about the S-axis will be denoted by a reference symbol $\delta$ and will be referred to as the scanning angle $\delta$.

According to the pattern illustrated in FIG. 3, the laser beam scanning (more specifically, one cycle of scanning from one end to the other end of a scanning range) in the direction about the S-axis is repeated at a fixed cycle $\Delta t$ while changing the swing angle $\alpha$ in a sinusoidal manner in a predetermined angle range. In this case, the laser beam scanning can be performed in a state in which a substantially constant swing angle $\alpha$ is maintained by, for example, setting the temporal change pattern of the swing angle $\alpha$ such that the amount of change in the swing angle $\alpha$ in the duration of one laser beam scanning period is sufficiently small.

Alternatively, for example, the swing angle $\alpha$ may be intermittently changed by a predetermined amount, and each time the swing angle $\alpha$ is changed, the laser beam scanning may be performed in the state in which the swing angle $\alpha$ is maintained at a constant angle (i.e. a state in which the rotation of the LRF 1a in the direction of the Z-axis is stopped).

Further, for example, the rotational speed of the LRF 1a in the direction about the Z-axis or the timing of the laser beam scanning may be controlled such that the number of scanning cycles of a laser beam carried out per unit change amount of the swing angle $\alpha$ remains constant or substantially constant.

As described above, the distance measurement data of an object existing in the vicinity of the LRF 1a can be acquired in a three-dimensional manner by rotating the LRF 1a in the direction about the Z-axis and by performing the laser beam scanning (rotational scanning) in the direction about the S-axis.

For example, FIG. 2 illustrates one measurement point P (i.e. a laser beam reflection point on the surface of an object) at which a distance r is measured by the LRF 1a in the case where the swing angle $\alpha$ of the LRF 1a is a certain angle and the scanning angle $\delta$ of a laser beam (i.e. the azimuth angle of the projection line of a laser beam) is a certain angle. In this case, the position of the measurement point P changes in the three-dimensional manner when the swing angle $\alpha$ or the scanning angle $\delta$ is changed. Thus, the laser ranging device 1 according to the present embodiment makes it possible to acquire, in the three-dimensional manner, the measurement data of the distance of an object existing in the vicinity of the LRF 1a.

Supplementarily, a set of the distance r, the swing angle $\alpha$, and the scanning angle $\delta$ corresponding to a randomly selected measurement point P expresses the position of the measurement point P by a spherical coordinate system. Further, the position of the measurement point P can be coordinate-converted into a position observed in a three-axis orthogonal coordinate system (e.g. the XYZ coordinate system illustrated in FIG. 2) from the set of the distance r, the swing angle $\alpha$, and the scanning angle $\delta$ corresponding to the measurement point P.

The laser ranging device 1 configured as described above can be installed in a mobile body such as, for example, a mobile robot or a vehicle. In this case, the laser ranging device 1 can be used as an external world recognition sensor for recognizing the position, the outer contour or the like of an object (e.g. a ground surface, a floor surface, an installed object, an obstacle, another mobile body, or the like) that exists in the vicinity of the mobile body.

According to the present embodiment, the measurement data of the LRF 1a is input to an arithmetic processing unit 2 (illustrated in FIG. 1A). In this case, the measurement data includes data indicating the swing angle $\alpha$ and the scanning angle $\delta$ of the projection line of a laser beam at the time of distance measurement in addition to the data indicating a distance measurement value.

The arithmetic processing unit 2 is composed of, for example, one or more electronic circuit units including a CPU, a RAM, a ROM, an interface circuit and the like, or one or more computers, or a combination of the electronic circuit unit and the computer.

The arithmetic processing unit 2 in the present embodiment mainly has a function for controlling the operations of the laser ranging device 1, a function for detecting an edge of an object existing in the vicinity of the LRF 1a (i.e. an area in which a laser beam is projected) on the basis of measurement data output from the LRF 1a, and a function for identifying and eliminating noise data from the measurement data of the LRF 1a, these functions being implemented by a hardware configuration or a program (i.e. software configuration) installed in the arithmetic processing unit 2.

The arithmetic processing unit 2 may alternatively be a control unit having a function for controlling the operation of a mobile body equipped with the laser ranging device 1.

The following will describe the processing performed by the arithmetic processing unit 2. First, the processing for detecting an edge of an object and identifying noise data will be outlined.

When attention is focused on, among the projection lines that indicate the projecting directions of a laser beam emitted by the LRF 1a, a plurality of projection lines which pass through the vicinity of an edge of an object and which are close to each other (e.g. a plurality of projection lines having a sufficiently small difference in the scanning angle $\delta$, such as projection lines that are adjacent to each other in the direction about the S-axis), the difference between the distance measurement value of a measurement point corresponding to a certain projection line and the distance measurement value of a measurement point corresponding to another projection line is apt to be relatively large.

Further, if a laser beam projection line passes through the vicinity of an edge of an object, then the reflected light of the object and the reflected light of another object behind the object will frequently be received by the LRF 1a (i.e. a multi-echo will occur). In this case, the distance measurement data of an object on the projection line tends to be abnormal data. For example, a situation may occur, in which an actual object does not exist at the position indicated by the measurement data.

Figure 6A:
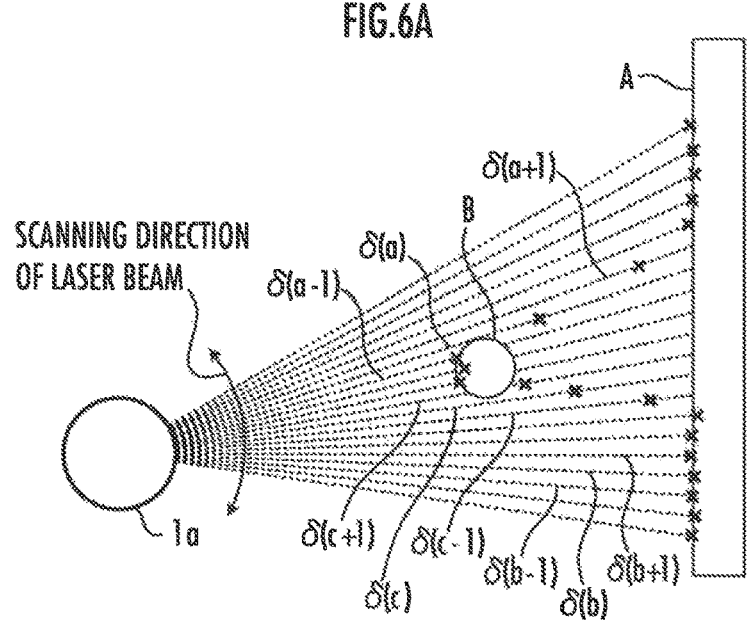
FIG. 6A is a diagram illustrating the scanning state of a laser beam directed to an object from the laser ranging device of the embodiment.

FIG. 6A conceptually illustrates a situation in which such a phenomenon takes place. In this example, an object B having a small diameter, such as a handrail, exists between the LRF 1a and an object A having a relatively large area, such as a wall. FIG. 6A illustrates a situation in which a laser beam (indicated by the dashed lines) is directed toward the object A from the LRF 1a, with the swing angle $\alpha$ of the LRF 1a being maintained at a constant or a substantially constant angle. The points marked with "x" in the drawing indicate the positions of the measurement points defined by a set of the scanning angle $\delta$ of each of a plurality of projection lines of the laser beam and the distance measurement value on each projection line. Further, reference symbols, such as δ(a+1), assigned to several projection lines of the laser beam denote the scanning angles δ of the projection lines.

The illustrated example indicates that the measurement points corresponding to the laser beam projection lines, the scanning angles δ of which are, for example, δ(a+1), δ(a), δ(c+1), δ(c), and δ(c−1), among the laser beams passing through the vicinity of the edge of the object B are located at positions that deviate from the actual position of the object A or the object B due to the influence of a multi-echo.

Figure 4:
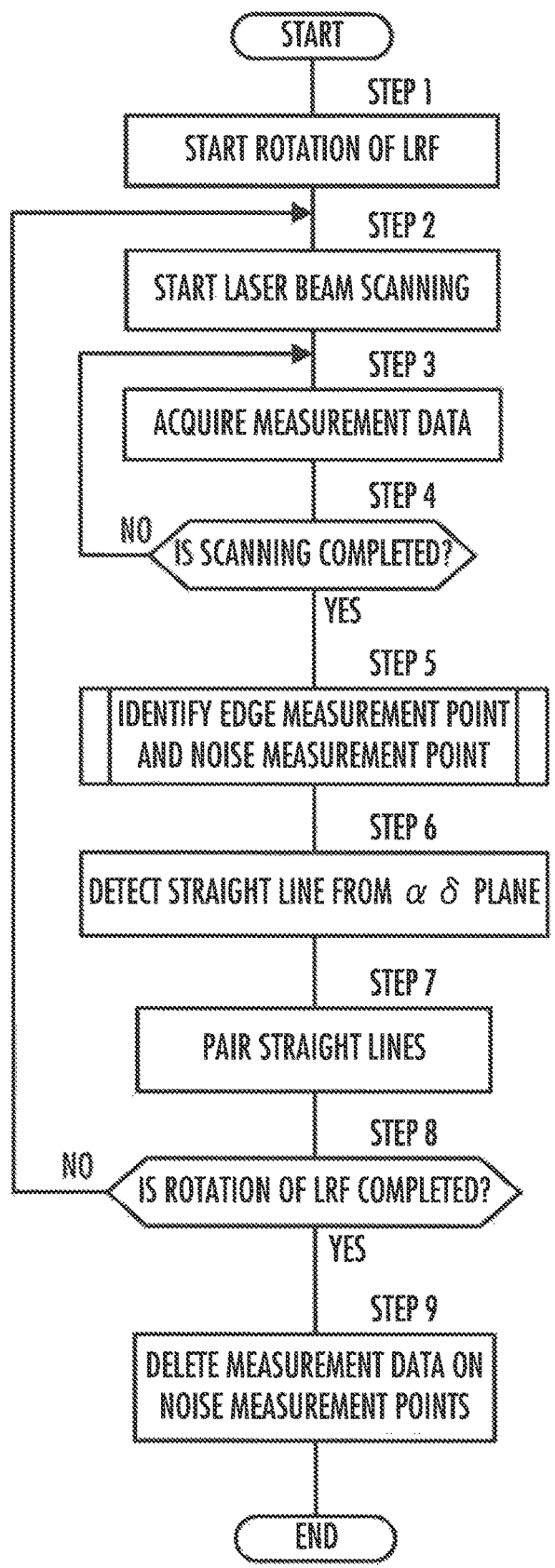
FIG. 4 is a flowchart illustrating the processing by the arithmetic processing unit illustrated in FIG. 1A.

The arithmetic processing unit 2 according to the present embodiment identifies the measurement points corresponding to an edge of an object (hereinafter referred to as "the edge measurement points") by using a change in distance measurement value in the vicinity of the edge of the object as described above and also identifies a measurement point that has an abnormal distance measurement value (hereinafter referred to as "the noise measurement point"). The processing by the arithmetic processing unit 2 is carried out as illustrated by the flowcharts of FIG. 4 and FIG. 5.

The arithmetic processing unit 2 controls the laser ranging device 1 such that the rotation of the LRF 1a in the direction about the Z-axis is started in STEP1 and then the laser beam scanning is started in STEP2.

Further, in STEP3, the arithmetic processing unit 2 acquires measurement data by the LRF 1a until the laser beam scanning (specifically, one cycle of scanning from one end to the other end of a scanning range) is completed and the determination result in STEP4 becomes affirmative. The measurement data includes the data that indicates the distance measurement value of the measurement point corresponding to each of the plurality of projection lines of the laser beam output from the LRF 1a, the data indicating the scanning angle δ of each projection line, and the swing angle α of the LRF 1a at the time when the laser beam is projected in each projection line.

According to the present embodiment, the swing angle α in one cycle of laser beam scanning has a constant or substantially constant value. In this case, the value of the swing angle α in the laser beam scanning may be a single value (e.g. the value of the swing angle at a start of the scanning).

Upon completion of the laser beam scanning, the determination result in STEP4 becomes negative. In this case, the arithmetic processing unit 2 then carries out the processing for identifying the edge measurement points and the noise measurement points in STEP5.

The processing in STEP5 is carried out as illustrated by the flowchart of FIG. 5 by using the measurement data of a plurality of measurement points acquired by the laser beam scanning in STEP2 to STEP4. In STEP11, the arithmetic processing unit 2 selects one measurement point as a target measurement point P(i). Subsequently, in STEP12, the arithmetic processing unit 2 sets a threshold value $e_{th}$ according to the measurement value of the distance of the target measurement point P(i) to identify the edge measurement points and the noise measurement points.

The threshold value $e_{th}$ is a threshold value of a positive value to be compared with a determination angle e(i), which will be discussed hereinafter, and is determined from the measurement value of the distance of the target measurement point P(i) according to an arithmetic expression, a map or the like, which is prepared in advance. In this case, the threshold value $e_{th}$ is set to be a smaller value (a value closer to zero) as the measurement value of the distance of the target measurement point P(i) becomes smaller.

Subsequently, in STEP13, the arithmetic processing unit 2 extracts, as line generation measurement points for generating an approximate straight line to be discussed hereinafter, the measurement point or points corresponding to one or more other projection lines that have directions close to the direction of the laser beam projection line corresponding to the target measurement point P(i) that is being selected.

According to the present embodiment, measurement points P(i+1) and P(i−1) corresponding to two projection lines on both sides of the projection line corresponding to the target measurement point P(i), for example, are extracted as the line generation measurement points. More specifically, the foregoing two projection lines are the projection line in a direction shifted by a predetermined pitch angle in the positive direction about the S-axis (i.e. a clockwise direction as facing the positive direction of the S-axis) with respect to the projection line corresponding to the target measurement point P(i) and a projection line in a direction shifted by a predetermined pitch angle in the negative direction about the S-axis (i.e. a counterclockwise direction as facing the positive direction of the S-axis) with respect to the projection line corresponding to the target measurement point P(i).

Figure 6B:
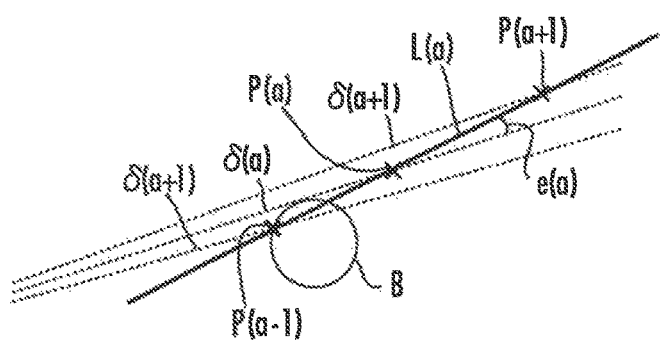
FIG. 6B and FIG. 6C are explanatory diagrams related to the processing in STEP13 to STEP15 of FIG. 5.

For example, if the target measurement point P(i) is a measurement point corresponding to the laser beam projection line of the scanning angle δ(a) in FIG. 6A, then the measurement points (P(a+1) and P(a−1) in FIG. 6B) corresponding to the laser beam projection lines of the scanning angles δ(a+1) and δ(a−1) will be extracted as the line generation measurement points.

Figure 6C:
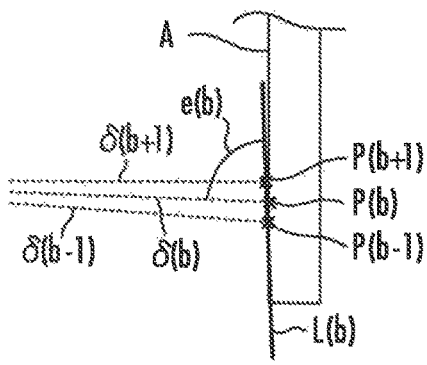

Further, if, for example, the target measurement point P(i) is a measurement point corresponding to the laser beam projection line of the scanning angle δ(b) in FIG. 6A, then the measurement points (P(b+1) and P(b−1) in FIG. 6C) corresponding to the laser beam projection lines of the scanning angles δ(b+1) and δ(b−1) will be extracted as the line generation measurement points.

Supplementarily, in the present embodiment, the target measurement point P(i) and the line generation measurement points P(i+1) and P(i−1) correspond to "the n number of measurement points" in the present invention, and the projection lines of laser beams corresponding to the target measurement point P(i) and the line generation measurement points P(i+1) and P(i−1) correspond to "the n number of projection lines that are close to each other" in the present invention.

Subsequently, in STEP14, the arithmetic processing unit 2 calculates an approximate straight line L(i) that passes through the target measurement point P(i) and the line generation measurement points P(i+1) and P(i−1) by using the distance measurement values of these measurement points P(i), P(i+1) and P(i−1) and the scanning angles δ(i), (i+1) and (i−1) of the projection lines corresponding to these measurement points P(i), P(i+1), and P(i−1), respectively. The approximate straight line L(i) is calculated by, for example, the method of least squares.

Further, in STEP15, the arithmetic processing unit 2 calculates, as a determination angle, an angle e(i) (the absolute value of an angle on an acute angle side) formed by the foregoing approximate straight line L(i) and the laser beam projection line corresponding to the target measurement point P(i). The determination angle e(i) provides an index value that indicates the degree of inclination of the approximate straight line L(i) with respect to the laser beam projection line corresponding to the target measurement point P(i).

For example, if the target measurement point P(i) is a measurement point on the laser beam projection line of the scanning angle δ(a) in FIG. 6A, then the approximate straight line L(a) illustrated in FIG. 6B is calculated in STEP14. Further, in STEP15, the angle e(a) illustrated in FIG. 6B is calculated as the determination angle.

Further, if the target measurement point P(i) is, for example, a measurement point on the laser beam projection line of the scanning angle (b) in FIG. 6A, then the approximate straight line L(b) illustrated in FIG. 6C is calculated in STEP14. Further, in STEP15, the angle e(b) illustrated in FIG. 6C is calculated as the determination angle.

In the present embodiment, the laser beam projection line corresponding to the target measurement point P(i) corresponds to the "representative line" in the present invention.

If the target measurement point P(i) or the line generation measurement point P(i+1) or P(i−1) is a measurement point on the laser beam projection line that passes through the vicinity of the edge of an object, then the direction of the approximate straight line L(i) (L(a) in FIG. 6B) calculated in STEP14 will be a direction close to the direction of the laser beam projection line (i.e. the laser beam projection line of the scanning angle δ(a) in FIG. 6B) corresponding to the target measurement point P(i) (P(a) in FIG. 6B), as illustrated in, for example, FIG. 6B. Therefore, the determination angle e(i) (e(a) in FIG. 6B) in this case will be a relatively small angle.

Meanwhile, if the target measurement point P(i) and the line generation measurement point P(i+1) or P(i−1) are not measurement points corresponding to the laser beam projection lines that pass through the vicinity of the edge of an object, then the direction of the approximate straight line L(i) (L(b) in FIG. 6C) calculated in STEP14 will be a direction that shows a relatively marked difference from the direction of the laser beam projection line (i.e. the projecting direction of the laser beam of the scanning angle δ(b) in FIG. 6C) corresponding to the target measurement point P(i) (P(b) in FIG. 6C), as illustrated in, for example, FIG. 6C. Hence, the determination angle e(i) (e(b) in FIG. 6C) in this case will be a relatively large angle (an angle close to 90 degrees).

Figure 7A:
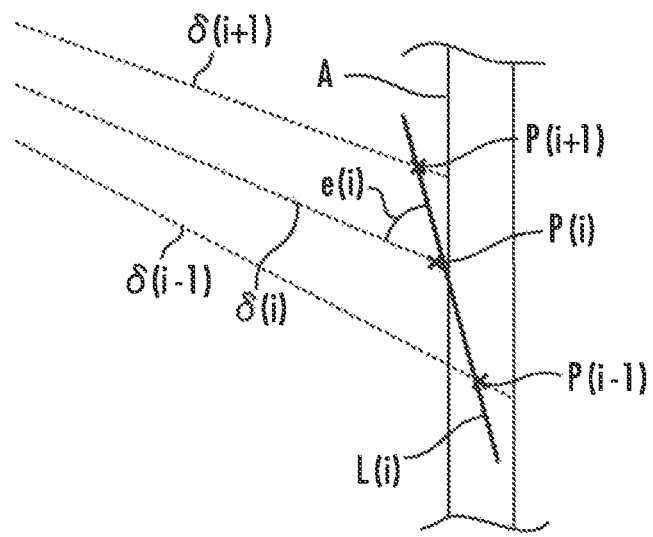
FIG. 7A and FIG. 7B are explanatory diagrams related to a threshold value set in STEP12 of FIG. 5.
Figure 7B:
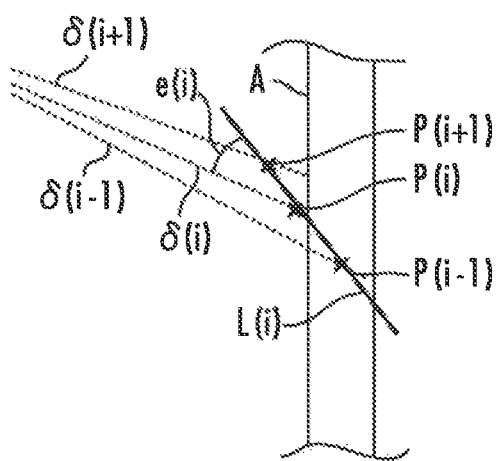

Further, when the variations in the measurement value of the distance of a measurement point on each laser beam projection line attributable to an error of the measurement value (i.e. an error in a state in which there are no influences of a multi-echo, and an error in rating attributable to the performance of the LRF 1) are considered, even if a place to which a laser beam is projected is flat, the approximate straight line L(i) calculated in the foregoing STEP14 may tilt as illustrated in FIG. 7A and FIG. 7B with respect to the surface (flat surface) of the projection place due to the variations in the measurement value of distance in the range of the error.

FIG. 7A is an explanatory diagram related to a case where the distance (specifically, the distance from the LRF 1a) of the object A to which a laser beam is to be projected is relatively large, and FIG. 7B is an explanatory diagram related to a case where the distance of the object A to which a laser beam is to be projected is relatively small.

Further, FIG. 7A illustrates a case where a distance measurement value of the measurement point P(i+1) on the laser beam projection line of the scanning angle δ(i+1) has an error in a direction that causes the distance measurement value to be smaller than an actual distance, and FIG. 7B illustrates a case where a distance measurement value of the measurement point P(i+1) on the laser beam projection line of the scanning angle δ(i−1) has an error in a direction that causes the distance measurement value to be larger than an actual distance.

As can be seen from the comparison between FIG. 7A and FIG. 7B, the direction of the approximate straight line L(i) is more likely to be closer to the laser beam projection line (i.e. the projection line of the scanning angle δ(i)) corresponding to the target measurement point P(i) due to the variations in the measurement value of the distance in the foregoing error range when the distance of the object is small (FIG. 7B) than when the distance of the object is large (FIG. 7A). This is because the interval of the radiation points of laser beams (i.e. the radiation points on the surface of the object A) corresponding to two adjacent projection lines decreases as the distance from the LRF 1a to the object decreases.

According to the present embodiment, therefore, the arithmetic processing unit 2 sets, in the foregoing STEP12, the threshold value $e_{th}$ such that the threshold value $e_{th}$ becomes a smaller value (a value closer to zero) as the measurement value of the distance of the target measurement point P(i) is smaller.

Alternatively, the threshold value $e_{th}$ may be set according to, for example, the average value of the measurement value of the distance (average distance value) of each of the target measurement point P(i) and the line generation measurement points P(i−1) and P(i+1).

Then, the arithmetic processing unit 2 carries out, in STEP16, the processing for comparing the determination angle e(i) determined in STEP15 with the threshold value $e_{th}$ set in STEP12 (the processing for determining whether $e(i) < e_{th}$ applies).

If the result of the determination processing in STEP16 indicates that $e(i) < e_{th}$ applies (i.e. if the determination result in STEP16 is affirmative), then the arithmetic processing unit 2 identifies, in STEP17, one of the target measurement point P(i) and the line generation measurement points P(i+1) and P(i−1) as the edge measurement point. In the present embodiment, the target measurement point P(i), for example is identified as the edge measurement point.

Thus, if, for example, the target measurement point P(i) is the measurement point P(a) on the laser beam projection line of the scanning angle δ(a) in FIG. 6A, then the target measurement point P(i) (=P(a)) will be identified as the edge measurement point. Further, if, for example, the target measurement point P(i) is a measurement point on the laser beam projection line of the scanning angle δ(c) in FIG. 6A, then the target measurement point P(i) will be identified as the edge measurement point.

The measurement data (specifically, the set of a distance measurement value, the swing angle α, and the scanning angle δ) corresponding to the measurement point identified as the edge measurement point is stored and held in the arithmetic processing unit 2 as the measurement data related to the edge measurement point.

Figure 9A:
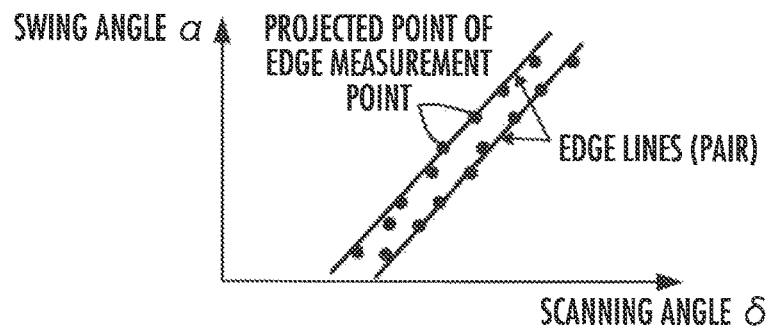
FIG. 9A, FIG. 9B and FIG. 9C are explanatory diagrams related to the processing in STEP17 and STEP18 of FIG. 5.
Figure 9B:
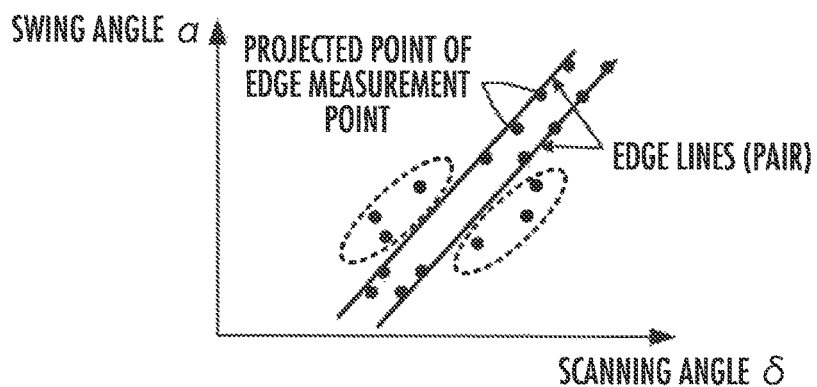
Figure 9C:
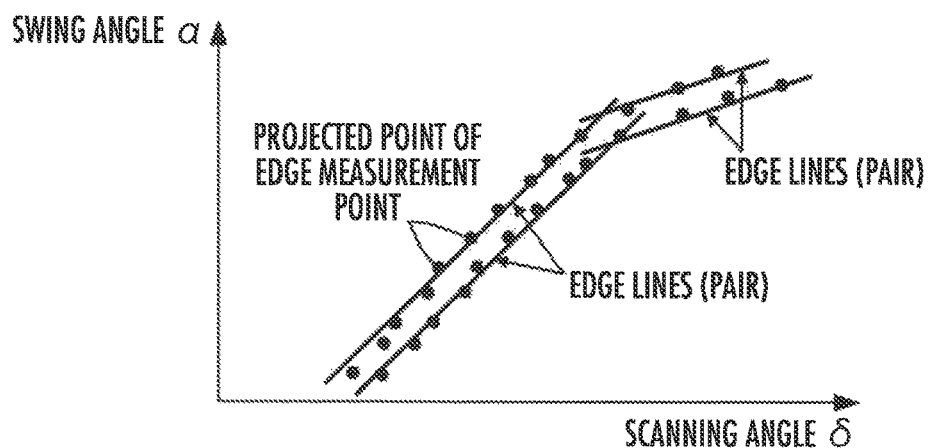

In STEP18, the arithmetic processing unit 2 projects the edge measurement point identified as described above onto an αδ plane. The αδ plane is a coordinate plane having the swing angle α and the scanning angle δ as two coordinate axis components, as illustrated in FIG. 9A to FIG. 9C.

In STEP18, the arithmetic processing unit 2 carries out the processing for determining the point on the αδ plane, which point is defined by a set of the value of the scanning angle δ and the value of the swing angle α of the projection line corresponding to an identified edge measurement point, as the projected point of the edge measurement point with respect to the αδ plane. Further, the arithmetic processing unit 2 stores and holds the coordinate value (the value of α, the value of δ, and the set) of the projected point. The black dots in FIG. 9A and FIG. 9B are points denoting the foregoing projected points.

Further, in STEP19, the arithmetic processing unit 2 identifies, as a noise measurement point, a measurement point having the largest distance among the target measurement point P(i) and the line generation measurement points P(i+1) and P(i−1). In other words, the arithmetic processing unit 2 identifies the distance measurement data corresponding to the noise measurement point as noise data.

Thus, if, for example, the target measurement point P(i) is the measurement point P(a) on a laser beam projection line of the scanning angle δ(a) in FIG. 6A, then a measurement point on the laser beam projection line of the scanning angle δ(a+1), which is the line generation measurement point P(a+1) illustrated in FIG. 6B, will be identified as a noise measurement point. As another example, if the target measurement point P(i) is a measurement point on, for example, the laser beam projection line of the scanning angle δ(c) in FIG. 6A, then a measurement point corresponding to the laser beam projection line of the scanning angle δ(c−1) will be identified as a noise measurement point.

Meanwhile, if the result of the determination processing in STEP16 indicates e(i)≥$e_{th}$ (if the determination result in STEP16 is negative), then the arithmetic processing unit 2 does not perform the processing in STEP17 to STEP19 (e.g. the identification of edge measurement points and the identification of noise measurement points).

For example, if the target measurement point P(i) is a measurement point corresponding to the laser beam projection line of the scanning angle δ(b) in FIG. 6A, then the determination result in STEP16 will be negative, so that the processing in STEP17 to STEP19 will not be performed.

The measurement data (specifically, the distance measurement value and a set of the swing angle α and the scanning angle δ) corresponding to a measurement point identified as a noise measurement point is stored and held as the measurement data on the noise measurement point in the arithmetic processing unit 2.

After carrying out the processing in STEP17 to STEP19, or if the determination result in STEP16 is negative, then the arithmetic processing unit 2 determines in STEP20 whether the sequential selection of the target measurement point P(i) has been terminated.

If the determination result is negative, then the arithmetic processing unit 2 returns to the foregoing STEP11 to select the target measurement point P(i) anew. For example, a measurement point corresponding to the projecting direction that is adjacent, in the positive direction (or the negative direction) about the S-axis, to the laser beam projection line corresponding to the previously selected target measurement point P(i) is selected as the new target measurement point P(i).

In the manner described above, the processing in STEP11 to STEP20 is repeated until the determination result in STEP20 is switched to affirmative.

Thus, the edge measurement points and the noise measurement points are identified in an exploratory manner. In the loop processing in STEP11 to STEP20, a measurement point identified as an edge measurement point or a noise measurement point may be selected as the target measurement point P(i) or the line generation measurement point P(i).

When the determination result in STEP20 becomes affirmative, the processing illustrated by the flowchart of FIG. 5 is terminated. This completes the detailed description of the processing in STEP5 of FIG. 4.

Figure 8:
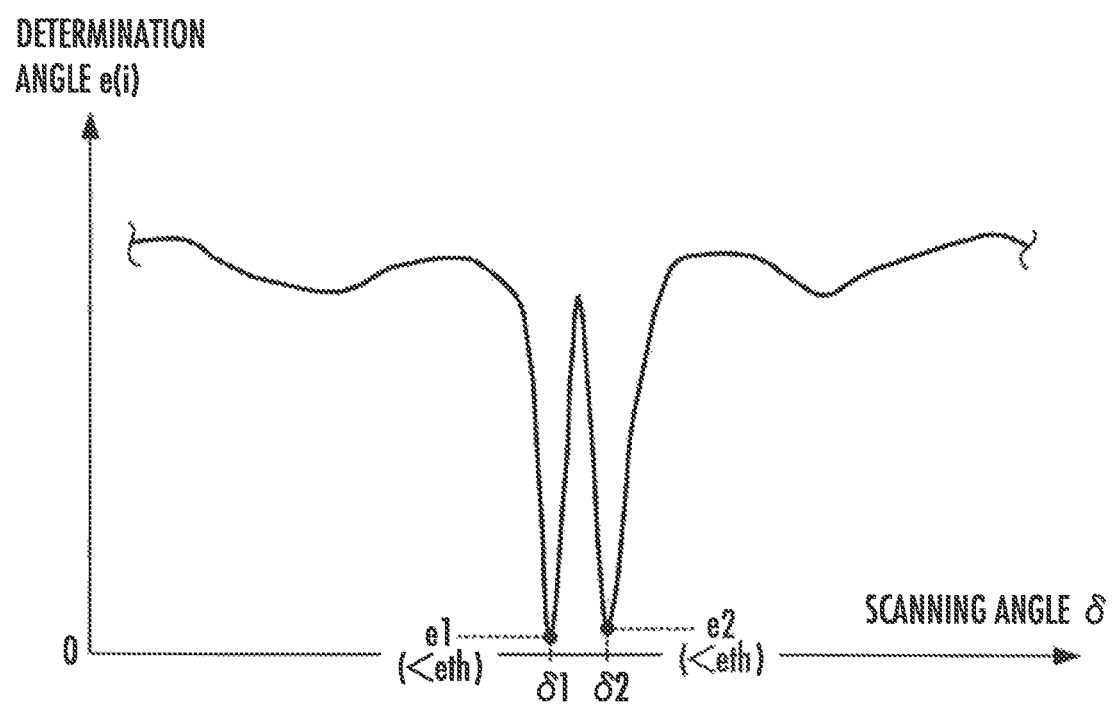
FIG. 8 is a graph illustrating an example of the change pattern of a determination angle calculated in STEP15 of FIG. 5.

FIG. 8 is a graph illustrating the relationship between the scanning angle (i) corresponding to each target measurement point P(i) and the determination angle e(i) calculated as described above for the target measurement point P(i) by the foregoing processing in STEP5 (i.e. the change pattern of the determination angle e(i) relative to the scanning angle).

In this example, there are a stick-like object B, such as a handrail, and an object A, such as a wall, in the scanning range of a laser beam from the LRF 1a, as illustrated in FIG. 6A. In this case, a determination angle e1 calculated using a measurement point corresponding to the laser beam projection line of a scanning angle δ1 as the target measurement point P(i) and a determination angle e2 calculated using a measurement point corresponding to the laser beam projection line of a scanning angle Ω as the target measurement point P(i) will take values that are smaller than the threshold value $e_{th}$. Further, the measurement points corresponding to the scanning angles δ1 and Ω will be identified as the edge measurement points.

Returning to FIG. 4, after carrying out the processing in STEP5 as described above, the arithmetic processing unit 2 carries out in STEP6 the processing for detecting, as an edge line of an object, the straight line formed by a plurality of edge measurement points, which can be regarded as linearly arranged, from the αδ plane onto which the edge measurement points are projected as described above. This processing is carried out by a publicly known straight line detection method, such as Hough transform.

Further, if there are sets of two straight lines (edge lines) each that extend in parallel (or substantially parallel) to each other, then the arithmetic processing unit 2 carries out the processing for pairing the two straight lines (i.e. edge lines) of each set as a pair of straight lines in STEP7. In this case, the straight lines (i.e. edge lines) of each pair are regarded as equivalent to the edge lines on both sides of the object that extends like a stick, such as a handrail.

In a stage in which the number of cycles of laser beam scanning after the rotation of the LRF 1a is started is small, it is highly likely that no straight line as an edge line can be detected or an edge line cannot be properly detected. Therefore, the processing in STEP6 and STEP7 may be carried out after the number of cycles of laser beam scanning reaches a predetermined number.

Subsequently, the arithmetic processing unit 2 determines in STEP5 whether the rotation (specifically, the rotation in a predetermined range) of the LRF 1a has been completed, and if not yet completed (i.e. if the determination result in STEP5 is negative), then the arithmetic processing unit 2 repeats the processing from STEP2. If the rotation of the LRF 1a has been completed and the determination result in STEP5 switches to affirmative, then the arithmetic processing unit 2 deletes, as noise data, the measurement data on the noise measurement points identified by the processing in the foregoing STEP5.

For each cycle of laser beam scanning, the edge measurement point and the noise measurement point are identified and a projected point obtained by projecting the edge measurement point onto the αδ plane is determined in the manner described above. Thus, if there is a stick-like object, such as a handrail, extending in the scanning range of each laser beam scanning cycle, then two edge lines that are parallel to each other are detected on the αδ plane, as illustrated in FIG. 9A and FIG. 9B, by the processing in the foregoing STEP6 and STEP7 after a plurality of cycles of the laser beam scanning are performed. Further, the two edge lines are paired as equivalents to the edge lines on both sides of the object that extends like a stick.

FIG. 9B illustrates the case where there is another object partly attached to the stick-like object at the portions indicated by the dashed lines. Further, FIG. 9C illustrates the case where two pairs of edge lines have been detected because of the stick-like object having been bent.

Thus, the edge lines of an object can be identified on the αδ plane. Further, if a stick-like object, such as a handrail, exists, then the edge lines on both sides of the object can be recognized as a pair of edge lines on the αδ plane.

In this case, the edge lines of the object can be identified without the need for converting the measurement points (including the edge measurement points) into the points of a three-dimensional space coordinate system, such as an XYZ-coordinate system illustrated in FIG. 2 (i.e. without the need for the spatial position information of each measurement point), so that the edge lines of the object can be promptly identified concurrently with the rotational operation of the LRF 1a. In addition, the edge lines can be identified with high reliability.

Further, the edge measurement points as the points on the edge lines are identified using the foregoing determination angle e(i), thereby enabling the edge measurement points to be properly identified without being affected by a multi-echo or the like.

Further, according to the present embodiment, measurement data of low reliability (i.e. noise data) attributable to a multi-echo can be properly removed. This makes it possible to minimize a circumstance in which the position, the shape and the like of an object in the vicinity of the LRF 1a are erroneously recognized by using the noise data.

In the embodiment described above, three measurement points, namely, the target measurement point P(i) and the line generation measurement points P(i+1) and P(i−1), have been used to calculate the approximate straight line L(i). Alternatively, however, the line generation measurement point for calculating the approximate straight line L(i) (i.e. a measurement point other than a target measurement point) may be determined, for example, as described below.

When the spread angle of a laser beam in each projecting direction of the laser beam is denoted by θ, then the spread angle θ is approximately represented by expression (1) given below.

$$\theta \approx \lambda/D0 \quad (1)$$

where λ denotes the wavelength of the laser beam and D0 denotes the diameter of the laser beam at the laser beam output section. Hence, the spread angle θ takes a value unique to a laser ranging device, namely, the LRF 1a in the present embodiment.

If there is an edge of an object in the spread angle θ of a laser beam, then abnormal measurement data is apt to occur due to a multi-echo.

Therefore, for example, a measurement point (including the target measurement point P(i)) corresponding to each projected line that falls within the range of the foregoing spread angle θ, centering about the laser beam projection line corresponding to the target measurement point P(i) (the range being more specifically the range of δ(i)±(θ/2), δ(i) denoting the scanning angle of the laser beam projection line corresponding to the target measurement point P(i)), may be used as the measurement point for calculating the approximate straight line.

Further, in the foregoing embodiment, the angle e(i) formed by a laser beam projection line corresponding to the target measurement point P(i) and the approximate straight line L(i) has been used as the index value that indicates the degree of inclination of the approximate straight line L(i).

However, as an alternative, for example, a direction may be determined by averaging the directions of the projection lines corresponding to a plurality of measurement points used to calculate an approximate straight line, and the angle formed by the line of the averaged direction and the approximate straight line may be used as the index value that indicates the degree of inclination of the approximate straight line L(i).

Further alternatively, for example, a projection line in a direction that is closest to the line in the central direction (i.e. the averaged direction) among projection lines corresponding to a plurality of measurement points used to calculate the approximate straight line may be used as a representative line, and the angle formed by the representative line and the approximate straight line may be used as the index value that indicates the degree of inclination of the approximate straight line L(i).

Further, the laser ranging device 1 (the LRF 1a) in the present embodiment is adapted to perform the laser beam scanning by rotating the projecting direction of a laser beam. Alternatively, however, the laser ranging device in the present invention may be adapted to perform linear laser beam scanning in a direction orthogonal to the projecting direction of the laser beam, maintaining the laser beam in a constant or a substantially constant projecting direction. In this case also, edge measurement points and noise measurement points can be identified in the same manner as with the foregoing embodiment.

Further, if the LRF 1a is configured to be capable of, for example, outputting the data indicating the detection value of the intensity of a laser beam output in each projecting direction, together with distance measurement data in addition to being capable of measuring distances, then an edge measurement point can be identified using the detection value of the intensity of the reflected light of a laser beam in addition to, for example, a distance measurement value, or in place of a distance measurement value in the processing for identifying an edge measurement point.

What is claimed is:

1. A method for detecting an edge of an object by using measurement data of each of a plurality of measurement points obtained by a laser ranging device which projects a scanning laser beam in a predetermined direction to measure a distance of each of the plurality of measurement points corresponding to each of a plurality of projection lines of the laser beam in a scanning range of the laser beam, the method comprising:

inputting measurement data of the laser ranging device into an arithmetic processing unit that includes a processor and memory; and identifying the edge of the object based on the input measurement data by performing a processing on the arithmetic processing unit, the processing comprising:

a first step of extracting, from the plurality of measurement points, an n number of measurement points corresponding to an n number of projection lines that are close to each other, wherein one of the n number of measurement points includes a target measurement point and at least one other measurement point, and the n number of projection lines connect a common axis point and a respective one of the n number of measurement points, and the n number of projection lines have different angles about the common axis point from each other, wherein n is an integer of 2 or more;

a second step of calculating an approximate straight line that passes through the n number of measurement points by using the measurement data of each of the n number of measurement points;

a third step of determining a degree of inclination of the approximate straight line with respect to an averaged line, wherein the averaged line is a representative line that is the one of the n number of projection lines that corresponds with the target measurement point or a line projecting from the common axis point and having an angle about the common axis point that is an average of the different angles of the n number of projection lines corresponding to the n number of measurement points, and the degree of inclination being determined based on an angle formed at an intersection of the approximate straight line and the averaged line; and a fourth step of identifying, as a measurement point of an edge of the object, one measurement point among the n number of measurement points in a case where the degree of inclination is smaller than a predetermined threshold value.

2. The method for detecting an edge of an object according to claim 1, wherein the processing further comprises:

a fifth step of identifying, as noise data, the measurement data corresponding to a measurement point having a largest distance measurement value among the n number of measurement points in the case where the degree of inclination is smaller than the predetermined threshold value.

3. The method for detecting an edge of an object according to claim 1, wherein the processing further comprises:

a sixth step of variably setting the predetermined threshold value used in the fourth step according to a representative value of distance measurement values of the n number of measurement points or an average distance value obtained by averaging the distance measurement values of the n number of measurement points.

4. The method for detecting an edge of an object according to claim 1, wherein the processing from the first step to the fourth step is repeatedly carried out, and the processing in the first step of each cycle is carried out such that at least one measurement point among the n number of measurement points extracted in the first step of each cycle of the repetition is a measurement point that is different from measurement points extracted in the first step of another cycle.

5. The method for detecting an edge of an object according to claim 4, wherein the processing further comprises:

a seventh step of rotating a laser beam output section and performing the laser beam scanning such that the laser beam scanning is performed in a rotational direction about a first axis at a plurality of rotational positions of the laser beam output section in a direction about a second axis, thereby acquiring the measurement data of the plurality of measurement points obtained by the laser ranging device by the laser beam scanning at the plurality of rotational positions of the laser beam output section;

an eighth step of projecting the measurement points of each edge, which are identified by repeating the processing from the first step to the fourth step for each group of the plurality of measurement points, onto a two-dimensional plane having an azimuth angle of the direction about the first axis and an azimuth angle of the direction about the second axis as two coordinate axis components; and a ninth step of identifying a line formed by a group of projected points linearly arranged on the two-dimensional plane as an edge line of an object, wherein the laser ranging device is configured such that the laser beam scanning is performed in the rotational direction about the first axis, and the laser beam output section can be rotated about the second axis in a direction that is orthogonal to the first axis, and the processing from the first step to the fourth step is repeated for each group of the plurality of measurement points obtained by the laser ranging device in each scanning cycle of the laser beam corresponding to each of the plurality of rotational positions of the laser beam output section.

6. The method for detecting an edge of an object according to claim 5, wherein the ninth step further comprises a step of identifying, as the edge lines on both sides of an object that extends like a stick, a pair of lines, each of which is formed by a group of projected points linearly arranged on the two-dimensional plane, the pair of lines extending in parallel to each other.

7. A method for detecting an edge of an object by using measurement data of each of a plurality of measurement points obtained by a laser ranging device which projects a scanning laser beam in a predetermined direction to measure a distance of each of the plurality of measurement points corresponding to each of a plurality of projection lines of the laser beam in a scanning range of the laser beam, the method comprising:

a step A of rotating a laser beam output section and performing laser beam scanning with the laser ranging device such that the laser beam scanning is performed in a rotational direction about a first axis at a plurality of rotational positions of the laser beam output section in a direction about a second axis, thereby acquiring the measurement data of the plurality of measurement points obtained by the laser ranging device by the laser beam scanning at the plurality of rotational positions of the laser beam output section;

a step B of inputting measurement data of the laser ranging device into an arithmetic processing unit that includes a processor and memory, and identifying, via the arithmetic processing unit, the measurement point of the edge of the object from the plurality of measurement points based on the measurement data of the plurality of measurement points obtained for the plurality of rotational positions of the laser beam output section;

a step C of projecting the measurement point of each edge identified for each of the plurality of rotational positions of the laser beam output section onto a two-dimensional plane having an azimuth angle in the direction about the first axis and an azimuth angle in the direction about the second axis as two coordinate axis components; and a step D of identifying a line formed by a group of projected points linearly arranged on the two-dimensional plane as the edge line of the object, wherein the laser ranging device is configured such that the laser beam scanning is performed in the rotational direction about the first axis, and the laser beam output section can be rotated about the second axis in a direction that is orthogonal to the first axis.

8. The method for detecting the edge of the object according to claim 7, wherein the step D further comprises a step of identifying, as the edge lines on both sides of an object that extends like a stick, a pair of lines, each of which is formed by a group of projected points linearly arranged on the two-dimensional plane, the pair of lines extending in parallel to each other.

* * * * *